Aug. 8, 1961        J. C. GUILD        2,995,505
LIQUID SEALED NUCLEAR REACTOR CONTAINMENT VESSEL
Filed April 21, 1958        4 Sheets-Sheet 1

INVENTOR
JAMES CARRIE GUILD

BY *Lawson and Dawson*

ATTORNEYS

INVENTOR
JAMES CARRIE GUILD

United States Patent Office 2,995,505
Patented Aug. 8, 1961

2,995,505
LIQUID SEALED NUCLEAR REACTOR CONTAINMENT VESSEL
James Carrie Guild, Wigan, England, assignor to United Kingdom Atomic Energy Authority, London, England
Filed Apr. 21, 1958, Ser. No. 729,681
Claims priority, application Great Britain Apr. 25, 1957
2 Claims. (Cl. 204—193.2)

This invention relates to sealing devices between two relatively rotatable parts of the kind comprising an annular cavity in one of the parts and a sleeve on the second part arranged to dip into liquid in the cavity of the first part. Such sealing devices are hereinafter referred to as "liquid dip seals."

A simple liquid dip seal suffers from the disadvantage that a pressure surge on one side of the seal can cause sealing liquid to be ejected from the seal so that the seal is disrupted to allow escape of contained gas during the period of the surge and then does not restore itself, thus allowing continued escape through the disrupted seal.

The invention provides novel forms of liquid dip seal arranged to be self-restoring in the event of disruption by a pressure surge: in one form, avoiding ejection of the sealing liquid but allowing temporary escape of the contained gas during a pressure surge, in another form avoiding ejection of the sealing liquid and escape of the contained gas even during a pressure surge, and in a third form providing the characteristics of either of the preceding forms regardless of the direction in which the pressure surge operates across the seal.

According to the invention a liquid dip seal is characterised in having in its dipping part a passageway from a lower level on one side to a hgher level on the other side.

When two such seals are placed in series, and especially when the second seal contains a sealing liquid of greater density than the sealing liquid in the first seal, a device is presented which can avoid flow of gases through the seals during and consequent upon pressure surges. Seals according to the invention have a character rather like a one-way release valve and accordingly two seals arranged in "opposition" provide protection against pressure surges in either a "forward" or "reverse" direction through the seal.

The invention will now be described with reference to the accompanying drawings wherein.

Figure 1:
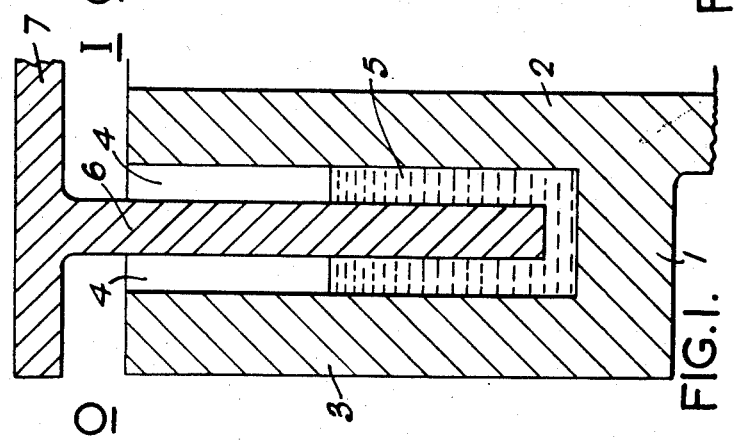
FIG. 1 is a sectional view of a simple known liquid dip seal.

In FIG. 1, a horizontal flange 1 on a cylindrical vessel 2 has an integral vertical flange 3. The vessel 2 and flanges 1, 3 form an annular cavity 4 containing a sealing liquid 5. A sleeve 6 on a rotatable circular cover plate 7 of the vessel 2 is arranged to dip into the liquid 5.

In this simple form of liquid dip seal, a pressure surge from the inside (I) or the outside (O) of the vessel 2 can cause the liquid 5 to be ejected, thus disrupting the seal.

Figure 2B:
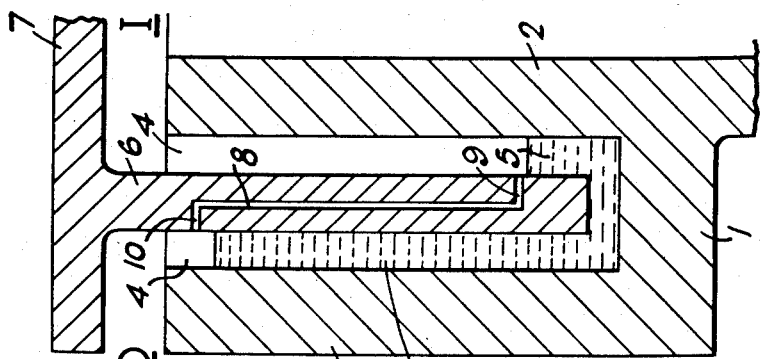
FIGS. 2A and 2B are sectional views of a liquid dip seal according to the invention.
Figure 2A:
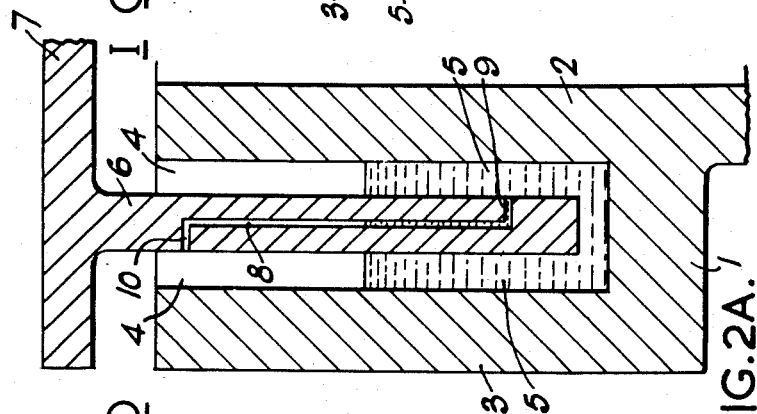

In FIG. 2A, parts corresponding to similar parts in FIG. 1 are given the same reference numerals. The sleeve 6 now has an internal passageway 8 (having ports 9, 10) from a lower level on one side of the sleeve 6 to a higher level on the other side of the sleeve 6.

FIG. 2B shows the effect of a pressure surge from the inside (I) of the vessel 2. The liquid 5 is forced down one side of the seal until the port 9 is uncovered. The plug of liquid in the passageway 8 is ejected and runs down the inside of the flange 3 and the pressure relieves itself through the clear passageway 8, the port 10 remaining uncovered as shown. As the pressure surge subsides the port 9 is covered and the seal is re-established to prevent further outflow of gas in the vessel 2.

Figure 3A:
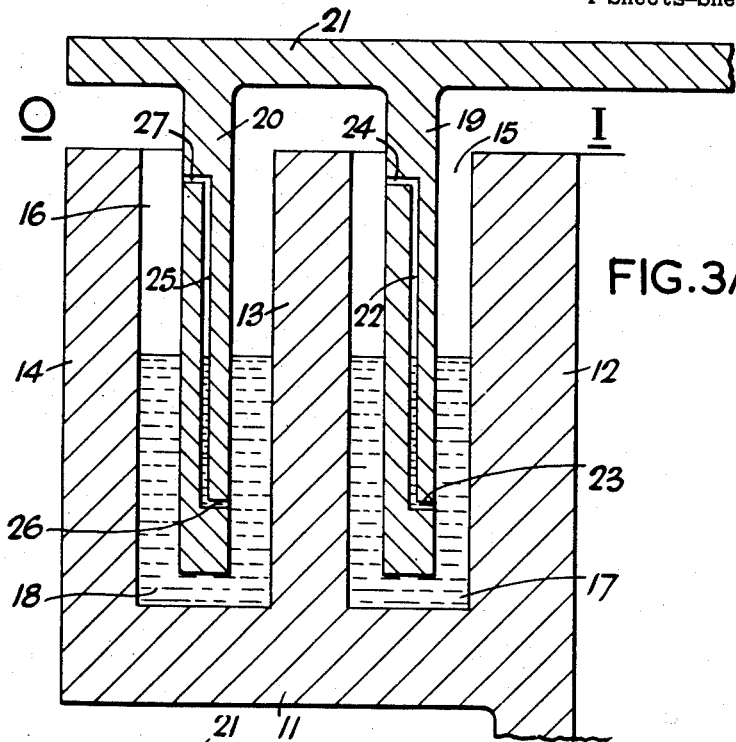
FIGS. 3A and 3B are sectional views of two liquid dip seals (also according to the invention) in series.

In FIG. 3A, a horizontal flange 11 on a cylindrical vessel 12 has integral vertical flanges 13, 14. The flanges 11, 13, 14 with the vessel 12 form two annular cavities 15, 16 containing sealing liquids 17, 18. Sleeves 19, 20 on a rotatable circular cover plate 21 of the vessel 12 are arranged to dip into the liquids 17, 18 respectively. The sleeve 19 has an internal passageway 22 having ports 23, 24 and the sleeve 20 has an internal passageway 25 having ports 26, 27.

In this form of liquid dip seal, a pressure surge from the inside (I) of the vessel 12 will force the liquid 17 down on one side of the cavity 15 until the port 23 is uncovered. The increased pressure is thus in part communicated to the other side of the cavity 15 through the passageway 22, the port 24 remaining uncovered. A reduced pressure differential then exists and the liquid 17 recovers the port 23. The liquid 18 in the cavity 16 is depressed according to the pressure in the space between the sleeves 19 and 20. The combination of the two liquid dip seals ensures that outflow through the seals should not occur during or following a pressure surge from the inside (I) of the vessel 2 until the pressure surge reaches a figure capable of uncovering the port 26.

Figure 3B:
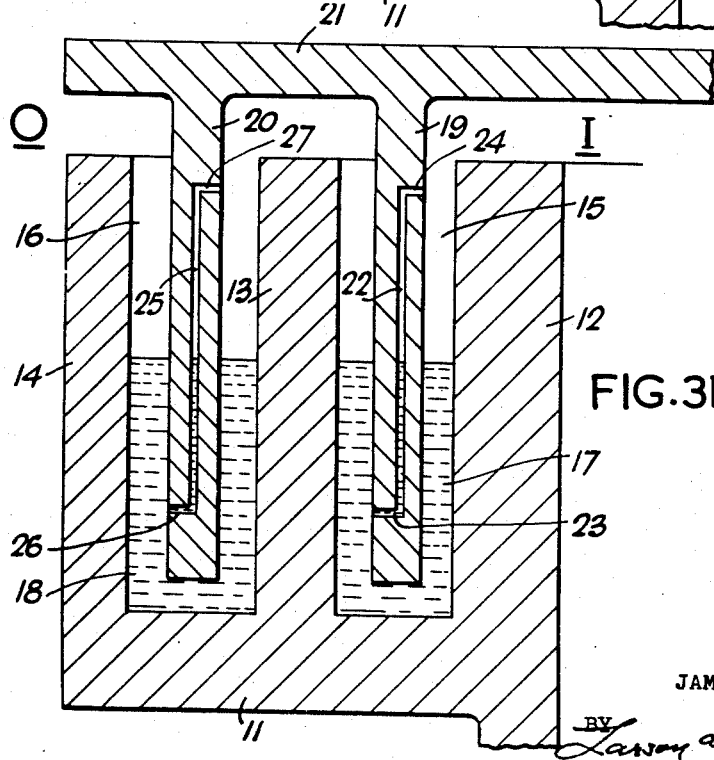

In FIG. 3B, parts corresponding to similar parts in FIG. 3A are given the same reference numerals. The ports 23, 24, 26, 27 are now reversed in direction, so that inflow through the seals should not occur during or following a pressure surge from the outside (O) of the vessel 12.

The two arrangements shown in FIGS. 3A and 3B may be combined to give two liquid dip seals in series combination offering protection against pressure surges from either side of the seals. Flow through the seals is avoided and ejection of sealing liquids is guarded against.

Figure 4A:
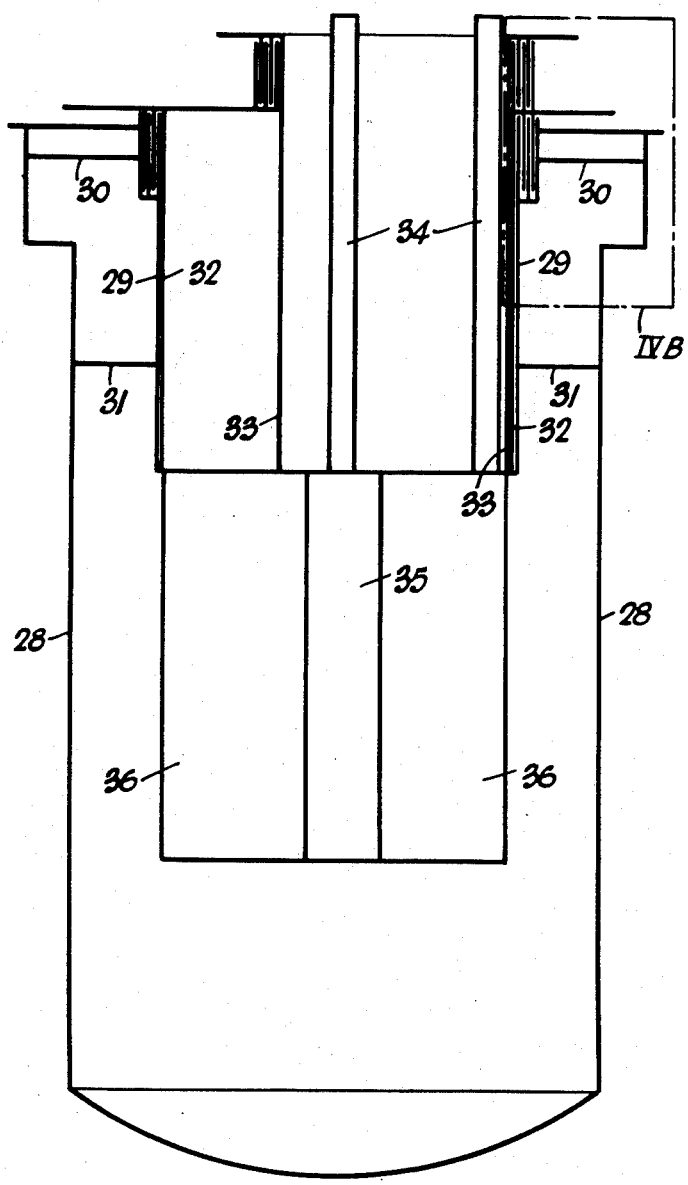
FIG. 4A is a diagram of a vessel for a nuclear reactor having two rotatable shields sealed by dip seals also according to the invention and FIG. 4B is an enlarged view of the chain dotted area IVB in FIG. 4A.

In FIG. 4A, a nuclear reactor vessel 28 has an inner cylindrical vessel 29 supported from the vessel 28 by annular plates 30, 31. Located in the vessel 29 is an outer rotatable shield 32 and eccentrically mounted in the shield 32 is an inner rotatable shield 33. The shield 33 has two holes, normally sealed during reactor operation by plugs 34, giving access to a core 35 of fissile material and a surrounding blanket 36 of breeder material. The shields 32, 33 remain stationary during reactor operation when they are mechanically sealed to the vessel 28, but are rotated during charging or discharging operations of the core 35 and the blanket 36. During such operations, liquid dip seals are used to prevent escape of radioactive gas from the vessel 28 and entry of air into the vessel 28.

Figure 4B:
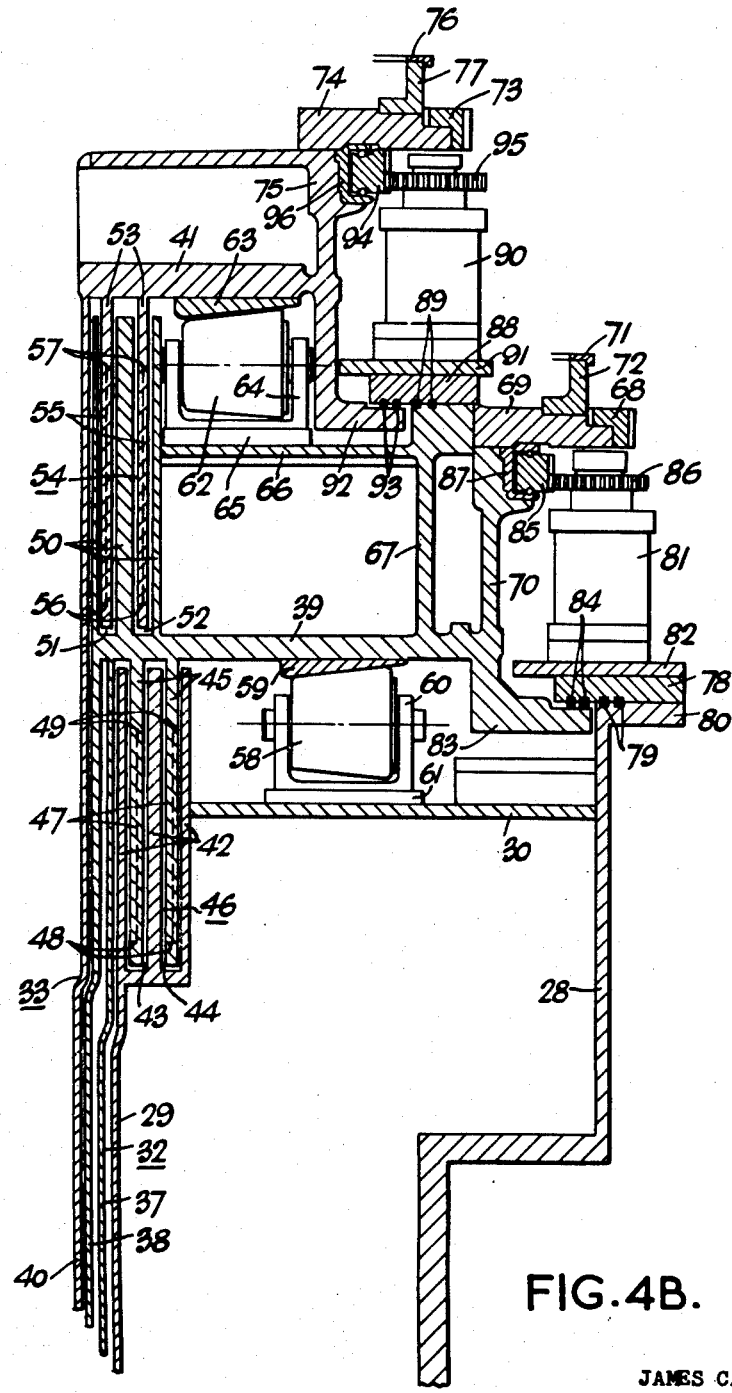

The shield 32 (FIG. 4B) has an outer cylinder 37, an inner eccentric cylinder 38 and a circular top end plate 39. The shield 33 has an outer cylinder 40 and a circular top end plate 41.

The vessel 29 has three vertical flanges 42 forming an inner annular cavity 43 and an outer annular cavity 44, the cavities 43, 44 containing liquid metal (not shown for the sake of clarity). Two sleeves 45 on the plate 39 are arranged to dip into the liquid metal in the cavities 43, 44 thus forming two liquid dip seals 46, in series combination between the vessel 29 and the shield 32. Each sleeve 45 has three equispaced passageways 47 and corresponding ports 48, 49 (the parts 47, 48, 49 being shown by dotted lines for clarity). Equispaced between the passageways 47 are three similar passageways with corresponding ports, the ports being reversed in direction from the ports 48, 49 (compare with FIGS. 3A and 3B).

The plate 39 has three vertical flanges 50 forming an inner annular cavity 51 and an outer annular cavity 52, the cavities 51, 52 containing liquid metal (not shown for the sake of clarity). Two sleeves 53 on the plate 41 are arranged to dip into the liquid metal in the cavities 51, 52 thus forming two liquid dip seals 54 in series combination between the shield 32 and the shield 33. Each sleeve 53 has three equispaced passageways 55 and corresponding ports 56, 57 (the ports 55, 56, 57 being shown by dotted lines for clarity). Equispaced between the passageways 55 are three similar passageways with corresponding ports, the ports being reversed in direction from the ports 56, 57 (compare with FIGS. 3A and 3B).

The liquid metal in the inner cavities 43, 51 is 60% by weight mercury and 40% by weight sodium and the liquid metal in the outer cavities 44, 52 is mercury.

The shield 32 when rotated is supported on twelve equispaced conical rollers 58. The shield 32 is supported through the top plate 39, a bearing flange 59 being provided. The rollers 58 are supported in brackets 60 which are mounted on pads 61 located on the annular plate 30.

The shield 33 when rotated is supported on six equispaced conical rollers 62. The shield 33 is supported through the top plate 41, a bearing flange 63 being provided. The rollers 62 are supported in brackets 64 which are mounted on pads 65 located on radial beams 66 welded to the outer flange 50 and to a flange 67 on the plate 39.

The shield 32 is rotated by a drive motor through gears which engage with a gear ring 68 mounted on an annular plate 69 located on a flange 70 of the plate 39. A circular graduated scale 71 is provided to indicate the position of the shield 32, the scale 71 being mounted on a circular bracket 72 located on the plate 69.

The shield 33 is rotated by a drive motor through gears which engage with a gear ring 73 mounted on an annular plate 74 located on a flange 75 of the plate 41. A circular graduated scale 76 is provided to indicate the position of the shield 33, the scale 76 being mounted on a circular bracket 77 located on the plate 74.

During reactor operation, the shield 32 is mechanically sealed to the reactor vessel 28, and the shield 33 is mechanically sealed to the shield 32.

An annular plate 78 is sealed by two silicone rubber sealing rings 79 of D-shaped section to a flange 80 on the reactor vessel 28. Twelve equispaced jacks 81 mounted on plates 82 on the plate 78 are provided to raise the outer shield 32 from the rollers 58 to form a mechanical seal between the plate 78 and a flange 85 on the outer shield end plate 39, two silicone rubber sealing rings 84 of D-shaped section being provided. The jacks 81 are raised by drive motors through gears engaging with a roller mounted gear 85 which engages with gear wheels 86 on the jacks 81. The gear 85 is located in a gear housing 87 located by the flange 70 and the plate 69.

An annular plate 88 is sealed by two silicone rubber sealing rings 89 of D-shaped section to the flange 67 on the outer shield end plate 39. Nine jacks 90 mounted on plates 91 on the plate 88 are provided to raise the inner shield 33 from the rollers 62 to form a mechanical seal between the annular plate 88 and a flange 92 on the inner shield end plate 41, two silicone rubber sealing rings 93 of D-shaped section being provided. The jacks 90 are raised by drive motors through gears engaging with a roller mounted gear 94 which engages with gear wheels 95 on the jacks 90. The gear 94 is located in a gear housing 96 located by the flange 75 and the plate 74.

During reactor operation the shields 32, 33 are mechanically sealed, the liquid metal in the seals 46, 54 having been drawn off into a reservoir. Following reactor shut down liquid metal is drawn into the seals 46, 54 so that when the mechanical seals are released to enable the shields 32, 33 to be rotated, the liquid dip seals 46, 54 operate effectively to prevent escape of radioactive gas from the vessel 28 and entry of air into the vessel 28. The provision of the passageways 47, 55 and the corresponding ports 48, 49, 56, 57 provides protection against pressure surges from the inside or outside of the vessel 28.

I claim:

1. In a nuclear reactor containment vessel having an aperture therein, an annular trough disposed adjacent the rim of said aperture, sealing liquid disposed in said trough, and a rotatable shield covering said aperture and having an annular flange extending into said trough a portion of which is immersed in said sealing liquid, means for preventing the displacement of said sealing liquid from said trough by pressure variation comprising a passageway disposed in said flange and opening at one end in said portion immersed by the sealing liquid and at the other end at a point above said portion but below said rim of the aperture.

2. Means according to claim 1 wherein the passageway disposed in said flange opens at one end in one side wall of the flange and opens at the other end in the other side wall of the flange.

References Cited in the file of this patent
UNITED STATES PATENTS

| | | |
|---|---|---|
| 294,666 | Peters | Mar. 4, 1884 |
| 643,230 | Muller | Feb. 13, 1900 |
| 1,506,610 | Booth | Aug. 26, 1924 |
| 1,874,727 | Wiggins | Aug. 30, 1932 |
| 1,874,742 | Harnsberger | Aug. 30, 1932 |
| 2,841,545 | Zinn | July 1, 1958 |
| 2,843,290 | Hooper | July 15, 1958 |
| 2,851,410 | Vernon et al. | Sept. 9, 1958 |

OTHER REFERENCES

Proceedings of the International Conference on the Peaceful Usese of Atomic Energy, vol. 3, United Nations, N.Y., 1955. Pages 340–341, 296–299, 307–311.

June 1955, Nucleonics, page 54.

A Developmental Fast Neutron Breeder Reactor by A. Amorosi et al. A paper given in the Atomic Industrial Forum, at the Sheraton-Park Hotel, Washington, D.C., September 27–28–29, 1955, pages 7, 9, 14 and 18.